(No Model.)

F. G. LEFAVOUR.
HAND WEEDER.

No. 355,182. Patented Dec. 28, 1886.

Witnesses:
Harry W. Robinson
Charles H. Figg.

Inventor:
Fred G. Lefavour.
by Alban Andrén, his atty

UNITED STATES PATENT OFFICE.

FRED G. LEFAVOUR, OF BEVERLY, MASSACHUSETTS.

HAND-WEEDER.

SPECIFICATION forming part of Letters Patent No. 355,182, dated December 28, 1886.

Application filed August 25, 1886. Serial No. 211,812. (No model.)

*To all whom it may concern:*

Be it known that I, FRED G. LEFAVOUR, a citizen of the United States, and a resident of Beverly, in the county of Essex and State of Massachusetts, have invented new and useful Improvements in Hand-Weeders, of which the following, taken in connection with the accompanying drawings, is a specification.

This invention relates to improvements in hand-weeders; and it is particularly well adapted for the purpose of weeding peas, beets, onions, cucumber-vines, and similar plants, in such a manner as to work close up to the roots or stalks without injuring or disturbing the foliage.

The invention is carried out as follows, reference being had to the accompanying drawings, where—

Figure 1:
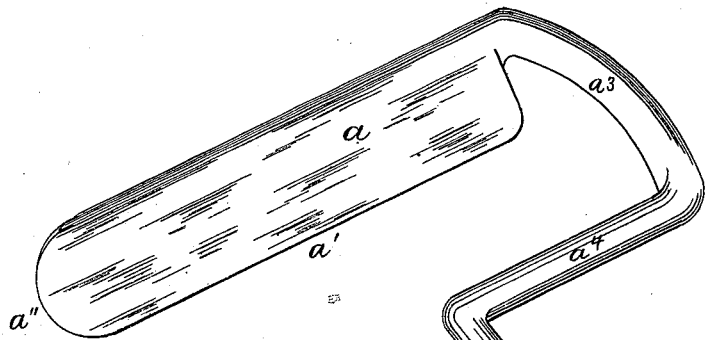
Figure 2:
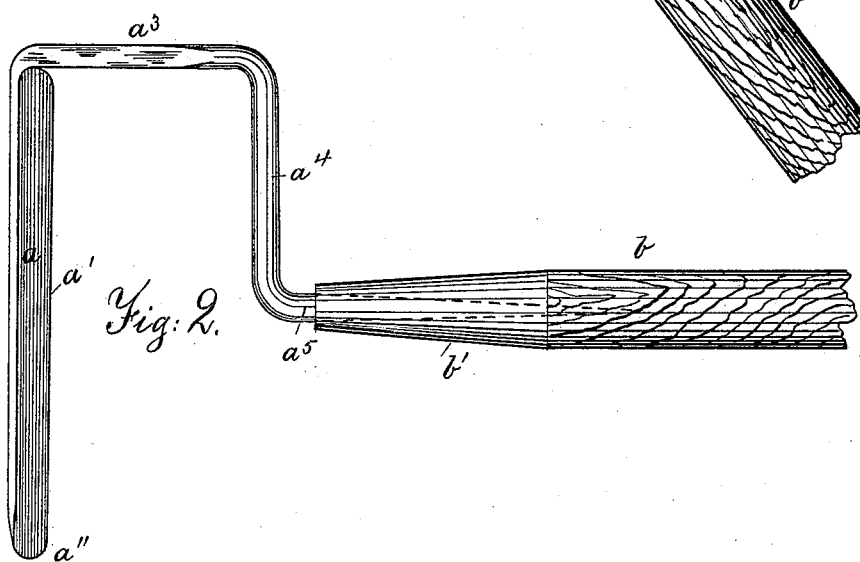
Figure 3:
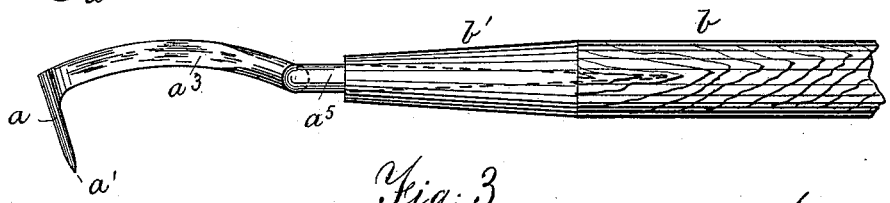

Figure 1 represents a perspective view of the improved weeding-tool. Fig. 2 represents a plan view, and Fig. 3 represents a side elevation of it.

Similar letters refer to similar parts wherever they occur on the different parts of the drawings.

$a$ represents the weeder-blade, having lower sharp edge $a'$ and sharpened end $a''$, as shown in the drawings. To one end of the blade $a$ is forged, in one piece with it, the shank, by means of which the weeder is attached to the handle $b$, said shank projecting from one end of the blade at or about a right angle to it, as shown at $a^3$ in the drawings, being afterward bent parallel to the blade, as shown at $a^4$ in Figs. 1 and 2, terminating in a spindle $a^5$, that is driven into the end of the handle $b$, as shown. The spindle $a^5$ is made at or about a right angle to the blade $a$, and the middle portion of the latter is arranged about in a line with the spindle $a^5$ and its handle $b$, so as to equalize the work on either side of the handle when the weeder is in use. The blade $a$ is slightly inclined to the axis of the spindle $a^5$ and handle $b$, as shown in Fig. 3, so as to produce the best results for weeding purposes.

The tool may be made right or left handed, as may be desired, without departing from the essence of my invention.

By having the free end $a''$ of the blade $a$ projecting to one side of the handle I am enabled to use the tool for weeding close up to the roots or stems without disturbing the foliage of the plants. This is a very essential feature of the invention and of great practical utility. The projecting free end $a''$ being sharpened, as shown and described, permits of the blade $a$ being used in a vertical, or nearly so, direction, as may be desired, for the purpose of breaking up lumps of earth, digging up roots, or for other similar purposes.

$b'$ is a ferrule, as usual, on the end of the handle $b$, as shown.

I am aware of United States Letters Patent granted, respectively, to L. King, October 20, 1868; R. L. Turner, April 13, 1880, and S. I. Haseltine, July 25, 1882, and I wish to state that I do not claim the constructions as therein shown and described; but What I wish to secure by Letters Patent and claim is—

The herein-described improved hand-weeder, consisting of the blade $a$, having its free sharpened end $a''$ projecting on one side of the handle $b$, and having in its other end the bent shank $a^3 a^4 a^5$, secured to handle $b$ and to the upper back portion of the blade $a$, substantially as and for the purpose set forth.

In testimony whereof I have signed my name to this specification, in the presence of two subscribing witnesses, on this 11th day of August, A. D. 1886.

FRED G. LEFAVOUR.

Witnesses:
ALBAN ANDRÉN,
HENRY CHADBOURN.